United States Patent [19]

Cook et al.

[11] 4,257,445
[45] Mar. 24, 1981

[54] SHIELDED VENT PORT

[75] Inventors: Sanford L. Cook, Ocean; Justin J. Molisani, Bricktown, both of N.J.

[73] Assignee: Buildex Incorporated, Huntington, N.Y.

[21] Appl. No.: 954,968

[22] Filed: Oct. 26, 1978

[51] Int. Cl.³ .................. F16K 15/02; F16K 17/18; F16K 49/00
[52] U.S. Cl. ..................... 137/341; 62/412; 137/360; 137/493.8; 137/526; 137/533.27; 137/533.29; 137/543.15
[58] Field of Search .............. 62/412; 137/493.8, 526, 137/533.27, 533.29, 543.15, 341, 360

[56] References Cited

U.S. PATENT DOCUMENTS

| 181,272 | 8/1876 | Lane | 98/119 |
|---|---|---|---|
| 501,253 | 7/1893 | Netzer | 98/119 |
| 1,003,819 | 9/1911 | Staples | 137/543.15 X |
| 1,275,557 | 8/1918 | Hamilton et al. | 137/543.15 X |
| 1,654,474 | 12/1927 | Wolter | 137/533.27 X |
| 2,810,397 | 10/1957 | Olson et al. | 137/543.15 X |
| 3,123,867 | 3/1964 | Combs | 137/493.8 X |
| 3,286,729 | 11/1966 | Mehaffy | 137/543.15 |
| 3,952,542 | 4/1976 | Berkowitz | 137/493.8 X |
| 4,116,213 | 9/1978 | Kamezaki | 137/360 |

FOREIGN PATENT DOCUMENTS 2342445 9/1977 France .................. 137/493.8

Primary Examiner—Gerald A. Michalsky
Attorney, Agent, or Firm—Blum, Kaplan, Friedman, Silberman & Beran

[57] ABSTRACT

A shielded vent port for equilization of the pressure on opposed faces of a wall comprises a frame for fitting into an opening in said wall, a conduit through said frame, a sloping plate in said conduit, said plate being sealed against the walls of said conduit and having a large aperture therethrough, and a riser lying against the upper face of said sloping plate, said riser preventing flow of air in a downward direction through said plate and being movable away from said plate to permit flow therethrough in an upward direction. To provide for flow of air through said wall in either direction, the frame may have two conduits therethrough with a sloping plate and a fitted riser in each, the planes of said plates sloping in opposed directions. The shield may be lifted away from the plate to permit flow of air therethrough by an excess of pressure below the plate or by a solenoid in response to an external signal.

12 Claims, 8 Drawing Figures

SHIELDED VENT PORT

BACKGROUND OF THE INVENTION

It frequently becomes necessary to provide for equalization of the pressures on opposite sides of a wall while preventing random flow of air therebetween. This situation generally arises in connection with large commercial refrigerators. Opening or closing of the door of such a refrigerator, where the door opens outwardly and closes inwardly, can cause a substantial and undesired change in the pressure within the enclosure. Change in pressure can also be caused by start-up of a compressor. A simple opening or vent port in the wall of the enclosure will not suffice since there will be random flow of air through the port, serious transfer of heat through the port and frost build-up in the port. As is evident, then, a vent port which will permit equalization of the pressures on opposite sides of the wall and which will yet prevent these phenomena is to be desired. A number of devices for achieving these objectives have been constructed and are commercially available. However, conventional devices are relatively complex and relatively expensive, apt to fail after short periods of use and not readily adaptable to variable conditions of use. The present invention is designed to overcome these difficulties.

SUMMARY OF THE INVENTION

A vent port in accordance with the present invention comprises a frame, generally rectangular in shape, which can be fitted into a suitably-shaped opening in a wall. A conduit passes therethrough, the ends of said conduit terminating at opposite faces of the wall. A plate spans the conduit, the periphery of said plate being sealed to the interior wall of said conduit. The plate slopes from the vertical at an angle of about 45°, thereby making an angle of about 45° with the top wall of said conduit and an angle of about 135° with the bottom wall of said conduit. The plate has a large aperture therein for the flow of air therethrough. A riser in the form of a flat sheet lies against the upper surface of the plate so that it closes the aperture against downward flow of air through the plate. In one embodiment of the invention the riser is lifted from the plate by the pressure of air whenever the pressure of the air at the lower surface of the plate exceeds that at the upper surface of the plate by a sufficient amount. In another embodiment the riser is lifted away from the plate for flow of air through the aperture on the plate by an electromagnet which may be activated from an external source by an electrical signal.

After displacement of the riser from the plate for flow of air through the aperture the shield may be returned to closed position by gravity. Conveniently, a spindle passing through an aperture in the riser serves as a guide. A coil spring may be positioned around the spindle for urging the riser into and toward closed position. The aperture in the plate may be positioned closer to the bottom of the plate than to the top thereof in order to compensate for the fact that in displacing the riser upwardly the riser approaches the top wall of the conduit thereby narrowing the space between the top edge of the riser and the top wall of the conduit for flow of air therebetween.

In order to provide for flow of air in both directions through the wall of the enclosure, the port may be provided with two conduits therethrough, the conduits being essentially parallel to each other. The second conduit is fitted with a plate and riser in a manner analogous to that aforenoted, but the two plates are disposed in their individual conduits so that the planes of the plates are at an angle of approximately 90° to each other. Each plate has an associated shield on the upper surface thereof.

To prevent sticking of the riser to the plate or to the spindle, one or both of the contact surfaces may be covered with a non-stick plastic coating or other member, a suitable plastic being polytetrafluoroethylene. Frost build-up and sticking are also prevented by provision of an electrical heater. The heater may be disposed on a wall of the conduit, either interior or exterior, or may be mounted on the diagonal plate. Also, the spindle may be heated electrically.

The riser is preferably of plastic, not only because of the low weight but because of the high resistance of plastic to heat flow. Where the riser is of polyurethane foam it may be stiffened with a peripheral ring or by coating with a suitable elastomer.

In a preferred embodiment the plate and the conduit are of molded plastic. In yet another preferred embodiment the conduit comprises a two-part sleeve which can be expanded so that the conduit can be mounted sealingly to walls of different thicknesses.

Accordingly, an object of the invention is a vent port for an enclosure, and, particularly for a commercial refrigerator, which provides for controlled flow of air through the wall of said refrigerator for equalization of the pressure therein with the ambient external pressure.

Another object of the present invention is a vent port for an enclosure wherein the flow of air therethrough takes place by reason of the difference in pressure and which prevents random air flow through said wall.

A further object of the present invention is a vent port for an enclosure wherein said port is opened by means of an electromagnet in response to an external signal.

Yet another object of the present invention is a vent port for a commercial refrigerator wherein said vent port is protected against formation of frost and against sticking of movable components in same.

An important object of the present invention is a vent port for an enclosure which can be fitted to walls of different thicknesses.

A significant object of the present invention is a vent port which can provide for flow of air in both directions through the wall of said enclosure.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4A is a partial view in section of an embodiment including a coating of non-stick plastic to prevent adhesion of the riser to the plate;

DESCRIPTION OF THE PREFERRED EMBODIMENTS

Figure 1:
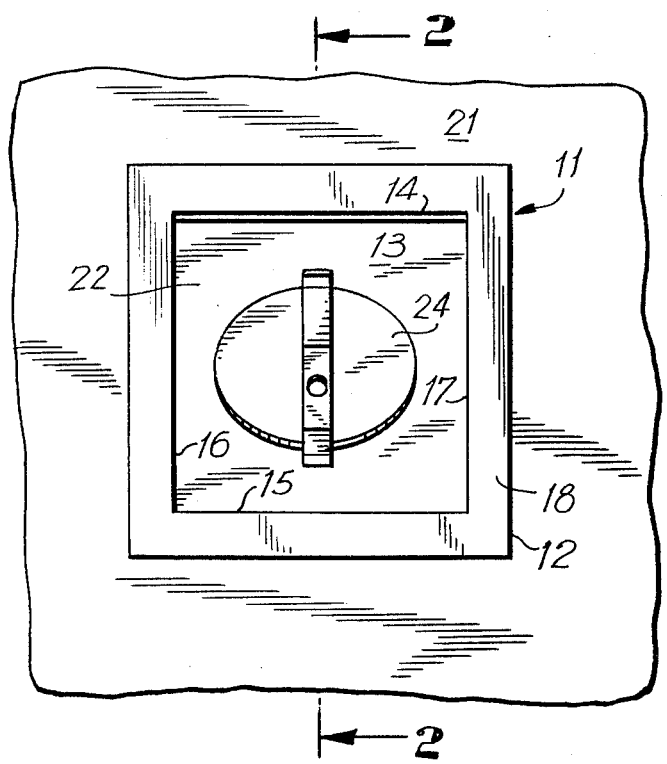
FIG. 1 is a front elevational view of an embodiment of the present invention.

Referring now to FIG. 1, the vent port in accordance with the present invention, indicated generally by the reference numeral 11, comprises a frame 12 which is flange-like in shape, a conduit 13 through said frame, said conduit having a top wall 14, a bottom wall 15, and side walls 16 and 17. Frame 12 has flanges 18 disposed for positioning at opposite faces of wall 21 in such fashion that air cannot travel between the flanges and the wall except through conduit 13. Positioned in conduit 13 is sloping plate 22, the periphery of sloping plate 22 being sealed against said top, bottom and side walls of said conduit 13 so that air cannot pass therebetween.

Figure 2:
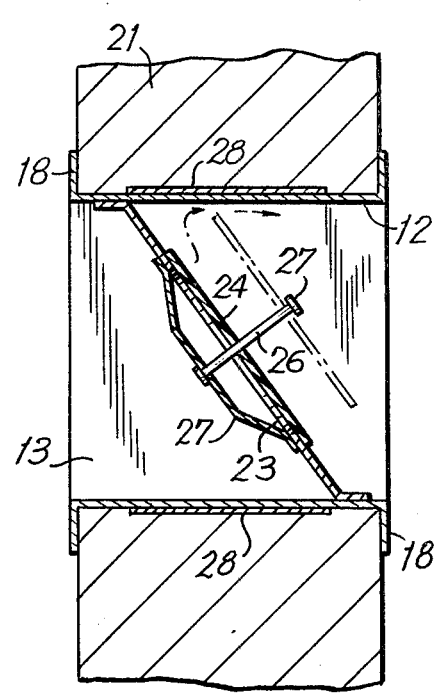
FIG. 2 is a view taken along line 2—2 of FIG. 1.

Referring now to FIG. 2, sloping plate 22 has therein an aperture 23. A riser 24 which may be of a light plastic or a metal is disposed removably against plate 22 to prevent the flow of air through aperture 23 from right to left as viewed in FIG. 2. More specifically, riser 24 is disposed for preventing the flow of air from above plate 22 to below same. When the pressure of the air below plate 22 exceeds that of the air thereabove by a sufficient amount, riser 24 will be lifted away from aperture 23, permitting air to flow through the conduit 13 for equalization of the pressure on both sides of vent port 11. FIG. 2 shows in phantom riser 24 lifted away from aperture 23 as the result of the force of the air pressure below plate 22 being sufficient to lift said riser away from the aperture.

The thermal conductivity of plastics is low, a desirable feature. Where the riser is of polyurethane it may be stiffened by means of a ring 25, FIG. 4, preferably of an elastomer such as neoprene or of a metal. Also it may be stiffened by means of a coating of a suitable elastomer.

To hold riser 24 in a condition such that it can return to the closed state after the pressure has been equalized, a spindle 26 having an expanded outer end 27 passes through the riser. Said spindle is supported by a bracket 27 which may be anchored to plate 22. As is evident, the lighter is the material of which riser 24 is made, the smaller will be the difference in pressure between the two faces of plate 22 necessary for lifting said riser away from said plate. It is for this reason that it is desirable, in the embodiment of FIG. 2, that riser 24 be of a light plastic or light metal.

Figure 4:
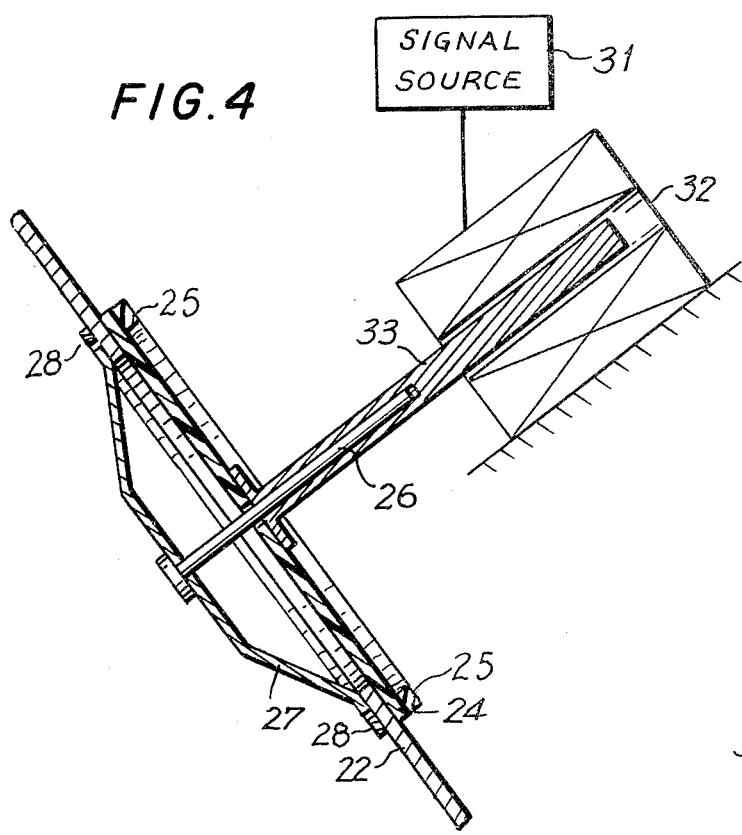
FIG. 4 is a partial view in section of an embodiment utilizing a solenoid for opening a vent port; said solenoid being operable by a signal from an external source.

One of the problems encountered with vent ports where the port is positioned in the wall of the refrigerator is that frost may be deposited around the borders of the relief element, in this case riser 24, preventing operation of the device. A resistance element, preferably in the form of a foil, may be positioned for heating the vent port. In the embodiment of FIG. 2, heater element 28 is shown as being positioned on the exterior of the walls of the conduit. However, it is possible for a heater element 28 to be disposed proximate the periphery of sheet 24 to insure that frost does not accumulate at this region. This arrangement is shown in FIG. 4. In a preferred embodiment, heater element ring 28 may be positioned at the periphery of aperture 23 in plate 22.

Figure 3:
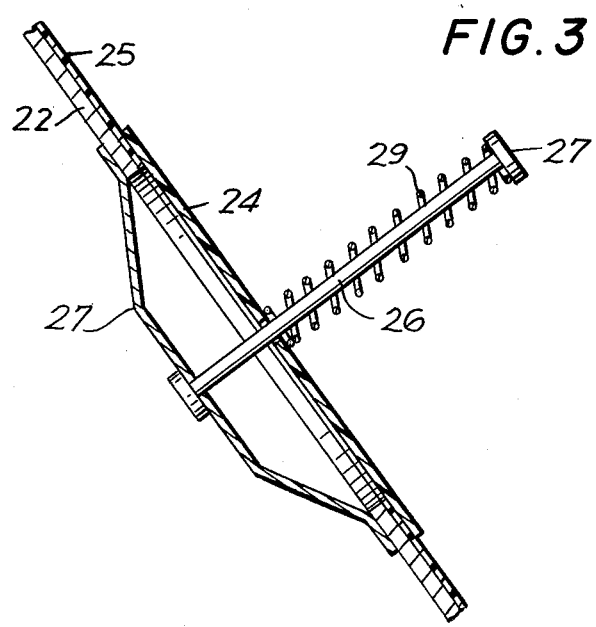
FIG. 3 is a partial view in section of an embodiment of the invention utilizing a coil spring for effecting closure of a vent port.

Another problem which may arise is that of leakage around the edge of riser 24. To insure that riser 24 is positioned tightly against plate 22, a coil spring 29 may be disposed around spindle 26 as shown in FIG. 3. Further, to prevent adhesion of riser 24 to plate 22 by reason of frost build-up, plate 22, as shown in FIG. 4A may be coated with a film 30 of a non-stick plastic such as polytetrafluoroethylene at the region of contact between said riser 24 and said sloping plate 22. Such a plastic film may also provide a cushioning effect and improve the tightness of the seal. Also, since riser 24 must fit closely around spindle 26 to prevent flow of air therebetween, sheet 24 may consist of such a non-stick plastic or a film of such a plastic (not shown) may be disposed over spindle 26.

In certain cases, it may be desirable that riser 24 be lifted away from sloping plate 22 in response to actions, such as moving a latch handle, which will shortly thereafter cause a change in pressure. Under such circumstances, arrangements can be made to provide an electrical signal from a source indicated generally by the reference numeral 31, where said source may be a motor-compressor or a door latch, to an electromagnet 32, said electromagnet being connected, as by core 33 for lifting riser 24 away from sloping plate 22. Although spindle 26 and bracket 27 are shown in FIG. 4, these elements may be dispensed with if the excursion of core 33 is controlled suitably.

Figure 5:
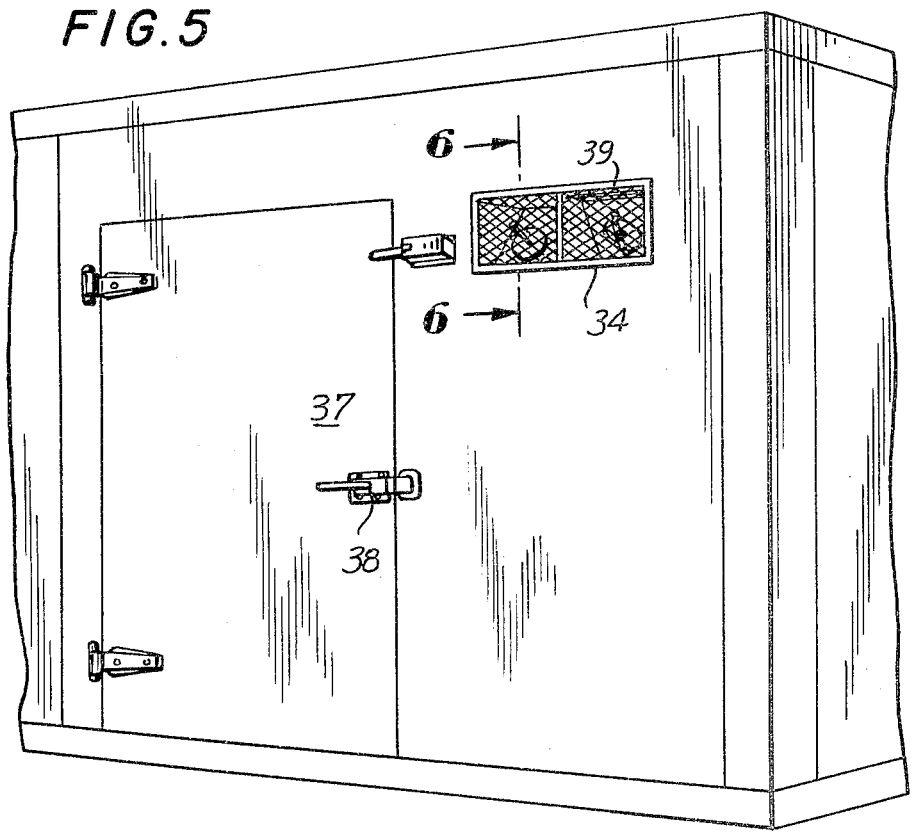
FIG. 5 is a view in perspective of a refrigerator fitted with two vent ports in accordance with the present invention.

A refrigerator, indicated generally by the reference numeral 35, is shown in FIG. 5, said refrigerator being fitted with a vent port constructed for permitting flow of air both out of and into said refrigerator while preventing random flow of air therethrough. As shown in said figure, vent port 34 provides for equalization of the refrigerator pressure when the pressure within said refrigerator falls below that of the external ambient pressure and vent port 36 provides for flow of air from the inside of said refrigerator to the exterior thereof when the pressure within said refrigerator exceeds the exterior ambient pressure. As is evident, where a riser is lifted away from the plate only by pressure difference, there must be some minimum value of the pressure difference before flow of air can occur. Accordingly, the vent ports generally remain closed except when the door 37 is operated or when a compressor within the refrigerator is activated.

As aforenoted, one or both of the vent ports 34 and 36 may be opened by a solenoid as shown in FIG. 4. in response to operation of latch 38 or to a compressor (not shown).

Figure 6:
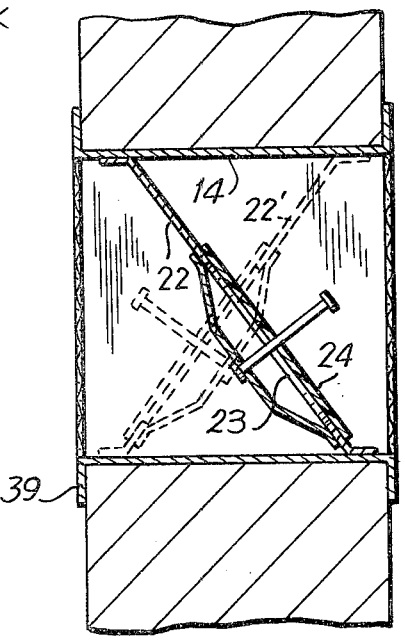
FIG. 6 is a view taken along line 6—6 of FIG. 5.

As is evident from FIG. 5, vent ports 34 and 36 may be disposed in a single frame 39. This construction is shown in side-sectional view in FIG. 6. As can be seen, the slopes of plates 22 and 22' are in opposite directions and may conveniently be at 90° to each other, although this angle will vary depending on the vertical dimension of the conduit and the thickness of the wall. Needless to say, there is nothing critical about this angle, it being necessary only that the angle to the vertical for each plate be great enough so that gravity will return each riser to the corresponding plate to close the aperture therethrough.

As is evident from FIG. 2, when riser 24 is lifted away from aperture 23, the riser approaches top wall 14, limiting the flow of air between the top edge of the riser and the top wall. For this reason, it is preferable that the aperture 23 in sloping plate 22 be positioned closer to the bottom thereof than to the top, thereby providing for more uniform flow and, thereby, more rapid flow around the riser and through the conduit. Also, the greater the slope of plate 22 relative to the vertical, the greater can be the size of the aperture in plate 22 for a given conduit height. In the extreme, plate 22 can be horizontal, but the flow of air through the conduit may be impeded in such a configuration unless the portions of the conduit above and below the plate are appropriately shaped.

Figure 7:
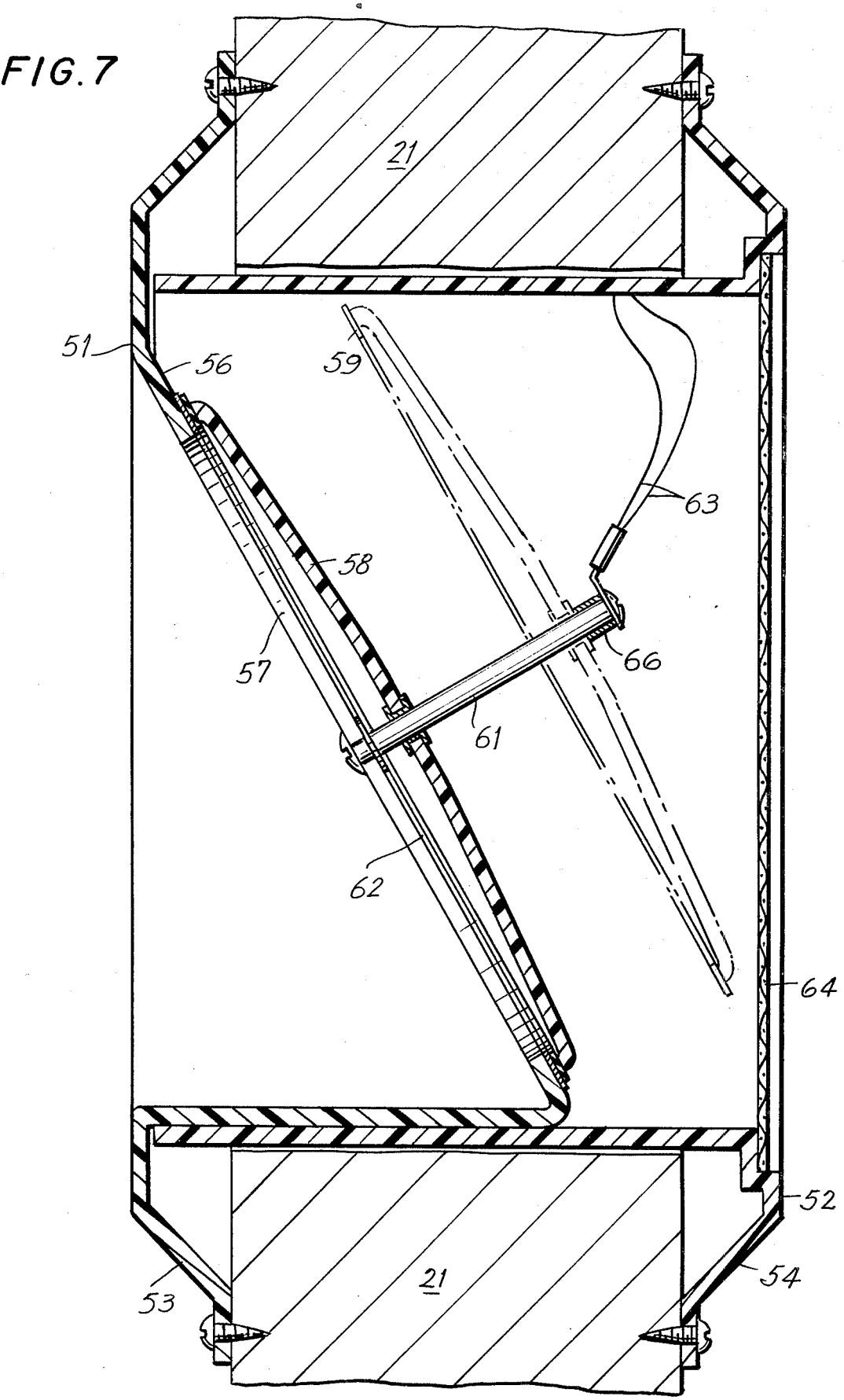
FIG. 7 is a sectional view of an embodiment of the invention which can fit walls of different thicknesses.

A preferred embodiment of the invention is shown in FIG. 7 which comprises a sleeve-like conduit which can accommodate itself to walls of various thicknesses. The conduit is constructed in two portions 51 and 52, both of said portions having flange-like elements 53 and 54 respectively which can be fastened to wall 21 as by screws as shown in FIG. 7 or other means. Portion 51 of said conduit also includes as an integral element thereof sloping plate 56 having an aperture 57 therein. Aperture 57 is covered by riser 58 shown both in closed position and in displaced position in phantom. Riser 58 has attached to the periphery thereof a ring 59 of a stiffening material wich may be of metal. Preferably, said ring is of a shock-absorbing material such as rubber. Spindle 61 which controls the movement of riser 58 may be supported by a bracket 62 bridging aperture 57. Spindle 61 may be kept free of frost by means of heating element 66 which receives power from the exterior through lead wires 63.

Preferably, portions 51 and 52 of the conduit of FIG. 7 are molded of an appropriate material such as polyurethane or ABS. In such a construction, bracket 62 can be formed as part of the molding of element 51. Also, element 52 may be formed so that it can conveniently receive and hold a screen 64 for preventing entry of insects into the enclosure.

In the embodiment of FIG. 7, conduit element 51 fits within conduit element 52 in sleeve-like fashion. Accordingly, conduit element 51 may be referred to as the interior conduit element and conduit element 52 may be referred to as the exterior conduit element. Also, it is to be understood that flanged sections 53 and 54 extend completely around the conduit elements so that the opening through wall 21 is completely closed except, of course, for aperture 57 through sloping plate 56. Also, it is to be understood that the embodiment of FIG. 7 can include two conduits with diagonal plates in each of said conduits sloping in opposite directions to provide for flow in both directions through the wall 21.

It will thus be seen that the objects set forth above, among those made apparent from the preceding description, are efficiently attained, and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A pressure-equalization vent port for equalizing the pressure on opposed sides of an enclosure wall, comprising:

a frame shaped for fitting an opening in said wall, said frame having a conduit therethrough, said conduit having a top wall, a bottom wall, side walls and open ends;

a plate disposed within said conduit, the periphery of said plate being sealingly joined to said walls of said conduit to prevent the passage of air between said plate and said walls, said plate being sloped with respect to said top and bottom walls whereby said plate has upper and lower surfaces, said plate having a large aperture therethrough;

riser means in sheet-like form disposed against said upper surface of said plate at the periphery of said aperture for preventing flow of air through said aperture in a downward direction; and spindle means disposed for permitting movement of said riser means in a direction essentially perpendicular to the plane of said plate at said aperture and upwardly therefrom for flow of air through said aperture only in said upward direction when the pressure on that end of said conduit proximate said lower surface of said plate is greater than at the other end of said conduit by an amount sufficient to overcome the weight of said riser means, said spindle means being mounted to said port in a direction essentially perpendicular to said plate, said riser means having a closely fitting aperture for passage of said spindle means therethrough and said spindle means having an expanded upper end for limiting the upward excursion of said riser means.

2. The pressure-equalization vent port as defined in claim 1, wherein said riser means is sufficiently light in weight relative to the area thereof to be lifted from said aperture by minor excess of pressure on the lower surface thereof, the return of said riser means to contact with said plate being effected by gravity.

3. The pressure-equalization vent port as defined in claim 1, further comprising bracket means affixed to said plate, the lower end of said spindle being attached to said bracket means.

4. The pressure-equalization vent port as defined in claim 1, further comprising coil spring means disposed about said spindle means for urging said riser means against said plate.

5. The pressure-equalization vent port as defined in claim 1, further comprising electrical heating means disposed for heating a wall of said port.

6. The pressure-equalization vent port as defined in claim 1, further comprising electrical heating means disposed for heating said guide means.

7. The pressure-equalization port as defined in claim 1, further comprising a coating of non-stick plastic on a contact surface of said port for preventing adhesion of frost thereto.

8. The pressure-equalization vent port as defined in claim 1, wherein said aperture in said plate is disposed closer to the lower edge of said plate than to the top thereof, thereby providing compensation for narrowing of the space for air flow over the top edge of said riser means resulting from upward displacement of said riser means during air flow.

9. The pressure-equalization vent port of claims 1, 2, 3, 4, 5, 6, 7 or 8, further comprising:
 a second conduit through said frame in a direction essentially parallel to that of said conduit, said second conduit having a top wall, bottom wall and side walls and open ends;
 a second plate disposed within said second conduit, the periphery of said second planar plate being sealingly joined to said walls of said second conduit to prevent the passage of air therebetween, said second plate being disposed so that the slope thereof and the slope of said plate are in opposite directions; and
 riser means disposed against the upper surface of said second plate for preventing flow of air therethrough in a downward direction, thereby providing for controlled flow of air in both directions through said wall.

10. The pressure-equalization vent port as defined in claim 1, wherein said conduit is constructed in two sections, one section fitting within the other in sleeve fashion to provide extensibility of said vent port so that said vent port may be fitted to walls of different thickness, and wherein said plate is integral with said one section.

11. The pressure-equalization vent port as defined in claim 10, wherein said sections are of molded plastic.

12. The pressure-equalization vent port as defined in claim 1, wherein said riser is of a flexible material and the periphery of said riser is provided with stiffening means affixed thereto.

* * * * *